(12) United States Patent
Charles et al.

(10) Patent No.: US 8,972,781 B2
(45) Date of Patent: Mar. 3, 2015

(54) SESSION RECOVERY DURING VIRTUAL MOBILE MANAGEMENT

(75) Inventors: Calvin Charles, Piscataway, NJ (US); Deepak Gonsalves, Bridgewater, NJ (US); Ramesh Parmar, Scotch Plains, NJ (US); Byung Joon Oh, Piscataway, NJ (US); Subramanyam Ayyalasornayajula, Kendall Park, NJ (US)

(73) Assignee: AetherPal Inc., South Plainfield, NJ (US)

( * ) Notice: Subject to any disclaimer, the term of this patent is extended or adjusted under 35 U.S.C. 154(b) by 171 days.

(21) Appl. No.: 13/599,808

(22) Filed: Aug. 30, 2012

(65) Prior Publication Data
US 2013/0055016 A1    Feb. 28, 2013

Related U.S. Application Data

(60) Provisional application No. 61/529,748, filed on Aug. 31, 2011.

(51) Int. Cl.
*G06F 11/00* (2006.01)
*H04W 76/02* (2009.01)
*H04W 76/04* (2009.01)

(52) U.S. Cl.
CPC .......... *H04W 76/028* (2013.01); *H04W 76/041* (2013.01)
USPC ........................................... 714/15; 714/4.21

(58) Field of Classification Search
CPC ....................................................... G06F 11/14
USPC .................. 714/15, 16, 14.1, 2, 4.21, 4.4
See application file for complete search history.

(56) References Cited

U.S. PATENT DOCUMENTS

| | | | |
|---|---|---|---|
| 6,826,194 B1 | 11/2004 | Vered et al. | |
| 7,146,129 B2 * | 12/2006 | Bostrom et al. | 455/3.03 |
| 7,565,141 B2 | 7/2009 | Macaluso | |
| 8,060,074 B2 * | 11/2011 | Danford et al. | 455/419 |
| 2005/0192052 A1 | 9/2005 | Tenhunen | |
| 2005/0245249 A1 * | 11/2005 | Wierman et al. | 455/419 |
| 2006/0068861 A1 | 3/2006 | Triestram et al. | |
| 2006/0075076 A1 * | 4/2006 | Sinha | 709/220 |
| 2007/0174520 A1 | 7/2007 | Moon | |
| 2008/0160956 A1 | 7/2008 | Jackson et al. | |
| 2009/0143059 A1 * | 6/2009 | Britt et al. | 455/419 |

\* cited by examiner

*Primary Examiner* — Dieu-Minh Le
(74) *Attorney, Agent, or Firm* — Volpe and Koenig, P.C.

(57) ABSTRACT

Disclosed is a method to enable wireless remote session recovery for a wireless device. Should a wireless device encounter a broken communication link during a virtual mobile management (VMM) operation, a method of automatic session recovery is disclosed which executes from a management console through a communication end-point gateway server in order to reconnect the mobile device. Under control of the session reconnection method, the device client listener and tools of wireless device re-establishes the signal and bearer links with a management console, over the air through the communication end-point gateway server (CEG). The communication utilizing the session recovery algorithm enables the wireless device to receive session information from the communication end-point gateway server, including the respective tools.

16 Claims, 5 Drawing Sheets

SESSION RECOVERY DURING VIRTUAL MOBILE MANAGEMENT

CROSS-REFERENCE TO RELATED APPLICATION

This application is related to U.S. patent application Ser. No. 12/426,555, filed on Apr. 20, 2009, and U.S. patent application Ser. No. 12/550,742, filed on Aug. 31, 2009. In addition, this application claims the priority date of U.S. Provisional Patent Application No. 61/529,748, filed Aug. 31, 2011, the contents of each applications are incorporated herein by reference.

FIELD OF THE INVENTION

The present invention relates to mobile wireless communication devices, systems, networks, and methods of operation. This invention describes remote management of the mobile devices connected to a computer. This invention deals with the various modes for the user to request remote support.

BACKGROUND OF THE INVENTION

In recent years, through public mobile communication networks various services have exploded in popularity, to satisfy the increased demand for services and for ever more sophisticated features, mobile communication networks are undergoing rapid deployment and upgrades.

With enriching telecommunications (3G/4G) environment, the proliferation of access methodologies such as CDMA/LTE, high-speed broadband access (Wi-Fi/WiMAX), the reliability of the mobile communication services also has increased by network and mobile device upgrades. As a result, as their primary platform for voice and data services, increased customers are accepting complex mobile communication networks. Also wireless devices, such as mobile handsets, wireless smartphones, PDAs, embedded wireless modules, etc., have become advanced in their processing and storage capacities, functionality, and ability to operate across many communication networks including Wi-Fi/WiMAX and across both terrestrial and satellite based networks. High-end wireless device sometimes referred to as "smart phones" offer a wide area of on-line and off-line capabilities, such as multimedia (e.g. music, videos or the like) downloading via the wireless network and off-line playback. Wireless devices comes increasing complexity of the programming of the devices, which also increases vulnerability to various types of hotspot area such as network disconnection, handover and internal software issues with such advances of the mobile communication network. Furthermore, at the same time, the entire Smartphones &Tablets environment has exploded with user-generated photos, multiple applications running and synchronization with your desktop or corporate server. The SmartPhones and Tablet environments are getting to be as complex as PC and Mac environments. These complex environments will require technical support on a SmartPhones or tablets that is just as good as that provided in PCs and Macs.

VMM is a tool that readily helps this situation by enabling the customer care agent with insight into these wireless devices in real time. In order for a smooth process of virtual mobile management, session recovery process is essential. If a wireless mobile device has a "network disconnect" state or user fault during virtual mobile management, session recovery mechanism will be securely operated according to device communication recovery process.

During VMM's service, the mobile device needs to be re-connected to management console to perform a diagnostic check of the device through automatic session reconnection technology. Hence a need exists for more effective techniques to re-connect management console, for example, that allow a customer care representative to seamlessly keep to check mobile device and that do not require a user to physically submit the device to service location personnel for servicing and/or that reduce "No fault return rate" of the wireless device and its use of the mobile communications services.

When a Customer Support Representative (CSR) is remotely viewing the mobile device through "Virtual Mobile Management" system it is important that the communication link between the two remain available all the time till the session ends. For any reason if the link breaks the entire session has to be reconnected. For the reconnection the system needs to know all the previous session details to automatically reconnect which becomes a challenging task. The current invention deals with "Automatic Session Reconnection" for "VMM".

SUMMARY OF THE INVENTION

Disclosed is a method to enable wireless remote session recovery for a wireless device that has encountered a broken communication links during a virtual mobile management (VMM) operation of the wireless device. In response to the failed links, automatic session recovery mechanism executes from management console through a communication end-point gateway server in order to reconnect the mobile device. Under control of the session reconnection method, the device client listener and tools of wireless device re-establishes the signal and bearer links with a management console, over the air through the communication end-point gateway server (CEG). The communication utilizing the session recovery algorithm enables the wireless device to receive session information from the communication end-point gateway server, including the respective tools. The VMM then resumes normal operation, by resuming automatic session reconnection execution using the session recovery techniques.

Thus, it is an objective of this invention to provide an improved method and apparatus for seamless connection a virtual mobile management that overcomes the foregoing and other problems.

Another objective of this invention is to provide a method and apparatus for robust linking of virtual mobile management using an automatic session reconnection mechanism.

Still another objective of this invention is to provide a method and apparatus for overcoming various broken links mode (signal/bearer) using a device communication recovery process.

Still another objective of the invention to help a customer service representative to automatically reconnect to a lost session without losing the session information.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
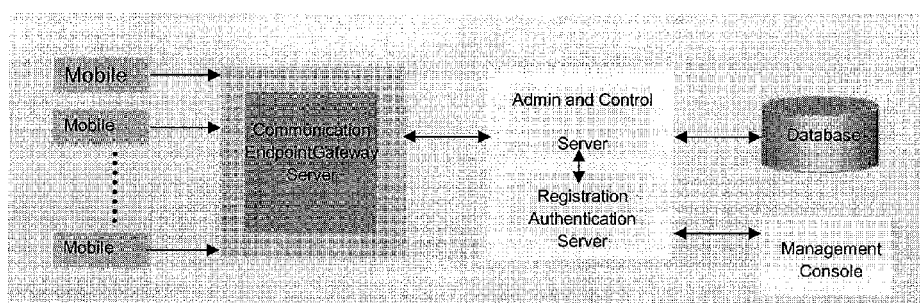
FIG. 1 is a diagram overview of System Architecture.

The following detailed description of the invention refers to the accompanying drawings. The same reference numbers are used in the drawings and the following description to refer to the same or similar elements whenever possible. FIG. 1 describes a schematic illustration of overall architecture about virtual mobile management. The system is designed such that it can be easily integrated with the existing System Center Mobile Device Manager (SCMDM) system to perform its functions without compromising on essential features such as ease of use and security. The overall structure consists of 5 components. A Communication End Point Gateway (CEG) Server acts as a proxy server (session mediation server). The session mediation server handles all the connections between the Mobile devices and Backend server connection requests. The Connection Endpoint Gateway Discovery feature provides load balancing functionalities.

The Admin and Control Server controls administration of servers and devices. In addition, the Admin and Control Server monitors the system status and performs load distribution on peripheral systems within perimeter network.

The Registration & Authentication Server handles all the device connections for different tools like Remote Control, Mobile Desktop, and Banner Notification. A single point of connection for the console to send all the requests.

The Management Console provides the Graphical User Interface (GUI) for the Administrator to manage devices.

The Database stores all the relevant information related to the Mobile device and all the session information.

Figure 2:
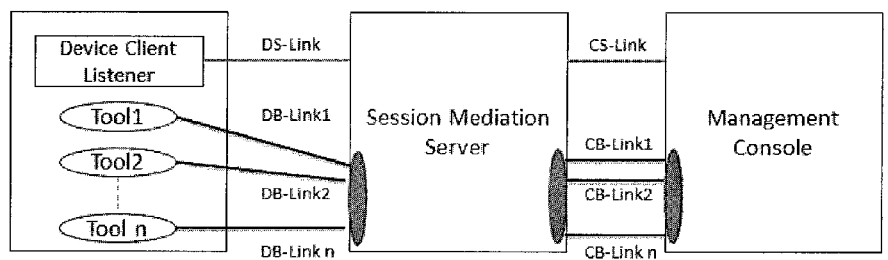
FIG. 2 is schematic of a detailed system design.

FIG. 2 is a schematic illustration of detailed system design. In this system design, device client listener role is to receive SMS (Short Message Service) request message from session mediation server to establish DS-Link. Tools role is the applications to perform as virtual mobile management like remote control, system diagnostics, health monitoring, etc.

DS-Link role is the device signal links for transferring the control commands such as device network state, authentication, ACK (Acknowledgement), Peer connect request, and Tool service request between mediation server and mobile device as an important communication channel. DB-Link role is the device bearer link for transferring the multimedia streaming traffics between mediation server and mobile device according to the respective tools.

Session Mediation Server role works the CEGor Proxy Server which handles all the connections between the Mobile devices and Backend server connection requests.

CS-Link role is the control signal link for transferring the control commands such as Alert link up/down for DS-Link and Alert link up for DB-Link between mediation server and management console. CB-Link role is the control bearer link for transferring the multimedia streaming traffics between mediation server and management console.

The current system has a client that consists of a "Listener" module and tools to perform "Virtual Mobile Management" like remote control, system diagnostics, health monitoring, and so forth. The Listener module establishes a device signal link (DS_LINK) with the server and optionally each tool may establish a dedicated device bearer link (DB_LINK) for the respective tool. The management console will also establish a control signal link (CS_LINK) for each session and optionally a control bearer link (CB_LINK) for respective tool. The links between the client in the device, the communication server and the management console are monitored by the keep-alive messages between the specified end-points to check if the links are operational. When the device and the Management console establish a dedicated bearer link, the server will just bind both the CB_LINK and the DB_LINK and the specified end-points for the keep-alive messages for a bearer link, are the Management console and the device. The specified end-points for a CS_LINK are the Management console and the server and the specified end-points for a DS_LINK are the device and the server.

Figure 3:
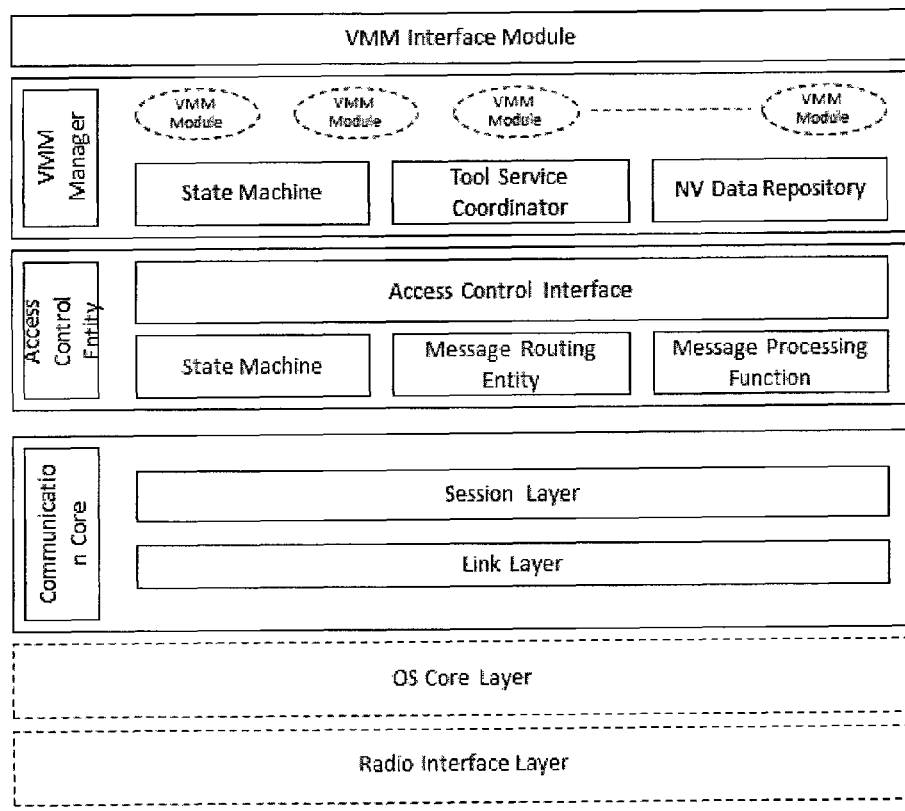
FIG. 3 is a system architecture for a VMM-RC Client.

FIG. 3 depicts the system Architecture for VMM-RC Client.

VMM Manager includes VMM modules which provide a multitude of tool services. Tool Services are grouped together that exhibit common functionality such as Remote Control, File Manager, Device Management, and so forth. State Machine, each tool service maintains an instance of the state machine. A State Machine defines a set of shared states that the tool service on the device application shares with the server. The Tool Service Coordinator maintains a collection of active tool service instances that are currently being serviced by the VMM application. This entity maintains the lifetime of all Tool Services, and is responsible in creating and destroying Tool Services. The NV (Non-Volatile) Data Repository provides authentication and authorization specific data that is shared between the VMM application and the server is maintained within the NV data repository. This data repository also serves the purpose of maintaining Tool Service configuration as well as VMM configuration data.

The Access Control Entity layer provides a set of functions to the Tool Services to communicate with the Control Center. It provides in the encapsulation of messages before forwarding it to the Communication Core. This layer is responsible to invoke an instance of the Communication Core layer and provides a state machine that defines the state of the VMM application. Access Control Interface provides a set of standard Application Programmer Interface or Application Programming Interface (API) to the Tool Services. These APIs provide a consistent communication platform to facilitate both synchronous as well as asynchronous communication. The ACI State Machine identifies the overall state of the VMM application. State transitions within the ACE State Machine triggers events that are handled by the VMM layer. The states are Open and Closed. Traffic flows through the ACI layer only in the Open State. The Message Routing Entity is responsible for routing all signal messages, destined to Tool Services to the respective event handlers. The Message Processing Function is a signal message pre-processor. This entity receives signal messages from the Session Layer destined towards Tool Services. It de-frames these messages prior to forwarding it to the Message Routing Entity to apply routing rules. Messages that are destined to the server from Tool Services are encapsulated here.

The Communication Core Layer is responsible to setup and maintain a dedicated communication channel with the Control Center. This layer provides the necessary framework to transport messages between the upper layers and the Control Center. It provides message encapsulation, framing, fragmentation and packet re-construction of Tool Service messages.

Figure 4:
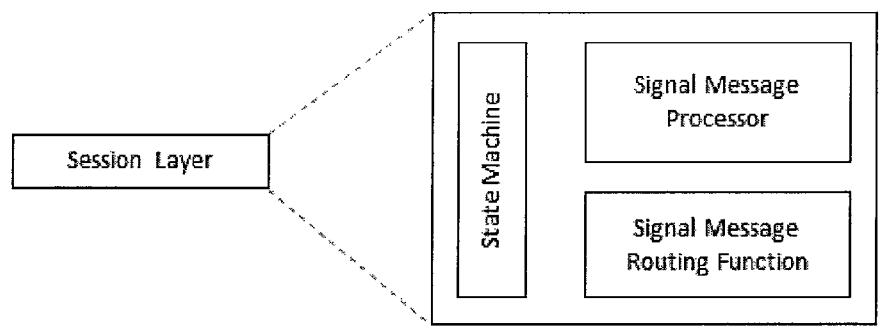
FIG. 4 is a session layer module.

Referring now to FIG. 4, the session layer maintains a set of shared state between the CEG and the application. The session layer packets encapsulate signal messages that are transported between the CEG and the application. Each message within the session layer packet defines the source and destination to which the signal messages are to be delivered. The session layer consists of the following entities: State Machine: The state machine maintains a state within a predefined set of shared states between the application and the CEG. State changes within the state machine trigger the execution of state transition procedures within the application. Signal Message Processor: This entity is responsible to encapsulate and process signal messages that are transmitted between the CEG and the application. This entity is also responsible in influencing the state transition within the state machine by altering its state. Signal messages destined to VMM modules are forwarded to the Signal Message Routing Function. Signal Message Routing Function: This entity is responsible to forward signal messages to the appropriate destination. Signal messages destined to VMM modules are directly forwarded to VVM Tool Service Coordinator. Signal messages destined to the CEG are forwarded to the link layer.

Figure 5:
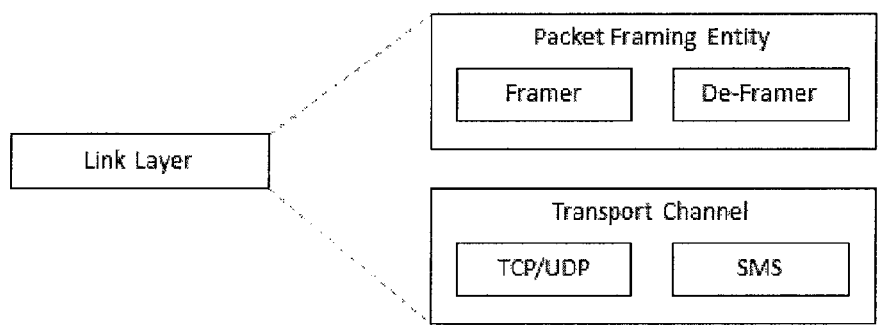
FIG. 5 is a link layer module.

FIG. 5 depicts the Link Layer module. The link layer is responsible to establish and maintain a dedicated communication channel between the client and the CEG. The Link Layer encapsulates all messages within its frame prior to forwarding it to the network. Packets that are received by the Link Layer from the network are re-constructed and de-framed prior to forwarding it to the upper layer. The following components form the Link Layer. This layer checks for message integrity.

The Packet Framing Entity is responsible to encapsulate messages into Link Layer frames. These frames are then forwarded to the Transport Channel, to be forwarded to the network layer. When a network packet is received by the Packet Framing Entity, it inspects the packet and verifies the integrity of the packet. Malformed packets are silently discarded.

The Transport Channel binds to the appropriate transport layer of the underlying operating system, which is dependent upon the VMM Tool Service. It is responsible to forward messages to the network layer and receives messages from the network layer. It provides notification to the upper layer on the state of the network layer through asynchronous events.

Figure 6:
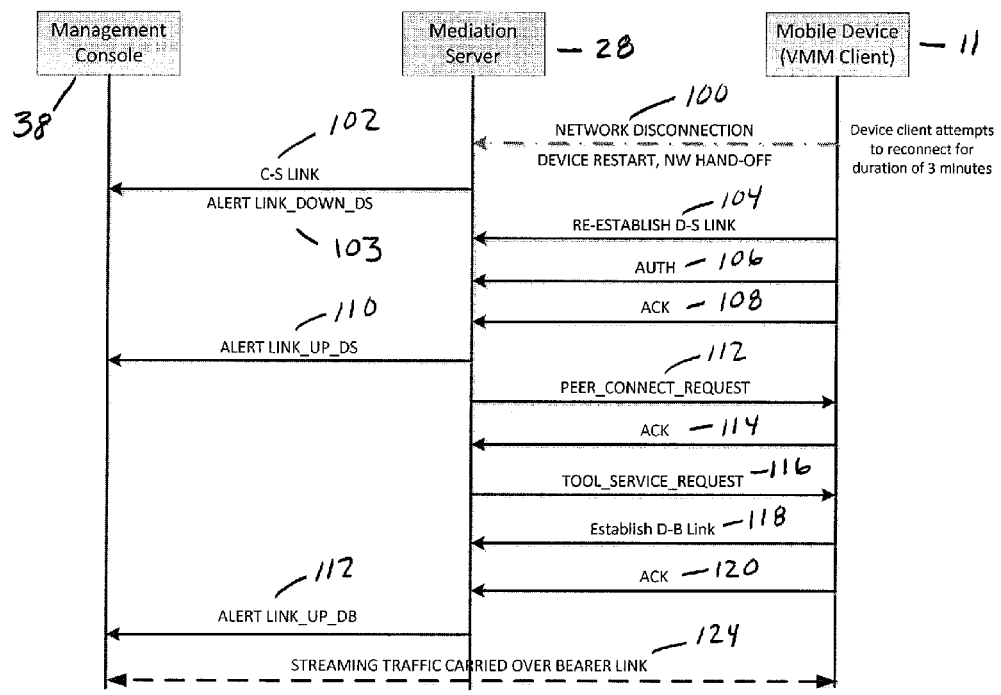
FIG. 6 is a device communication recovery process.

FIG. 6 illustrates a timing-sequence diagram illustrating the establishment of device communication recovery between a mobile device (VMM client) and a session mediation server. In this session recovery call process; if mobile device fails to establish the device signal link within 3 min of time, session recovery process is automatically operated according to signal link failure mode, bearer link failure mode, tool crash/communication loss between listener and tool.

As shown in FIG. 6, a network disconnection 100 occurs between the device 11 when the DS_LINK 20 is broken, the session mediation server 28 will transmit the state of the device session and all the related tools 14, 16, 18 for the specific device to RECONNECT state and will notify the Management Console 38 by sending a device ALERT (LINK_DOWN_DS) 103 signal over the CS_LINK 102. Any data sent for the device from the Management Console during the RECONNECT state will be dropped.

On receiving an ALERT (LINK_DOWN_DS) 103 the Management Console 38 will transmit the device session state and all the tools for the device 11 to SUSPENDED state and will stop communicating with the device.

Once the device 11 re-established the DS_LINK 104 with the server, the server will transmit the session state to OPEN and will notify the Management Console 38 by sending an ALERT (LINK_UP_DS) 110 and will send TSR signal message to the device for all the tools for that device that are in RECONNECT state and transmit all the tools to SETUP state. On receiving ALERT (LINK_UP_DS) 110 the control system will transmit the session state to OPEN.

Once the device tool bearer link is established with the server the respective tool state will be transmitted to OPEN and the Management Console 28 will be notified by sending an ALERT (LINK_UP_DB) 122 for the respective tool. On receiving the ALERT (LINK_UP_DB) 122, the Management Console 28 will transmit the respective tool state to OPEN and will continue the communication with the device for the respective tool.

When a tool detects that the bearer link (DB_LINK) is down, the tool will send a notification to the server through the AP Listener signal link (DS_LINK) 20 by sending an ALERT (LINK_DOWN_DB) and will transmit the device tool state to SUSPENDED and will wait for a duration of 120 sec for a RECONNECT signal message from the server to attempt to re-establish the connection with the server. If it fails to receive a RECONNECT signal message with in this duration, the tool will clean-up and the AP Listener will notify the server about the tool internal communication link closed by sending an ALERT (LINK_DOWN_DIS).

The server will transmit the tool state to RECONNECT and will notify the Management Console 38 by sending an ALERT (LINK_DOWN_DB) and will send a RECONNECT signal message to the respective tool through the device signal link (DS_LINK) 20. On receiving an ALERT (LINK_DOWN_DB) the Management Console 38 will transmit the respective device tool state to SUSPENDED and will stop the communication for the respective tool.

Once the device re-establishes the bearer link with the server, the device will transmit the tool state to OPEN. On device re-establishing the bearer link with the server, the server will transmit the respective tool state to OPEN and will notify the Management Console by sending a device bearer link up ALERT (LINK_UP_DB) 122. On receiving the ALERT (LINK_UP_DB) 122, the Management Console will transmit the respective tool state to OPEN and will continue the communication with the device for the respective tool.

On tool crash or communication lost between AP Listener and tool—detected by AP Listener On communication lost between AP Listener and tool, the tool will clean-up and the AP Listener will notify the server about the tool internal communication link is closed by sending an ALERT (LINK_DOWN_DIS).

The server will transmit the tool state to RECONNECT and will notify the Management Console by sending an ALERT (LINK_DOWN_DB) and will send the respective tool service request (TSR) signal message to the respective tool via device signal link (DS_LINK) 20 to restart the tool. On receiving an ALERT (LINK_DOWN_DB) the Management Console 38 will transmit the respective device tool state to SUSPENDED and will stop the communication for the respective tool.

Once the device re-establishes the bearer link with the server, the server will transmit the state to OPEN and will notify the Management Console by sending a device bearer link up ALERT (LINK_UP_DB) 122. On receiving the ALERT (LINK_UP_DB) 122, the Management Console 38 will transmit the respective tool state to OPEN and will continue the communication with the device for the respective tool.

Figure 7:
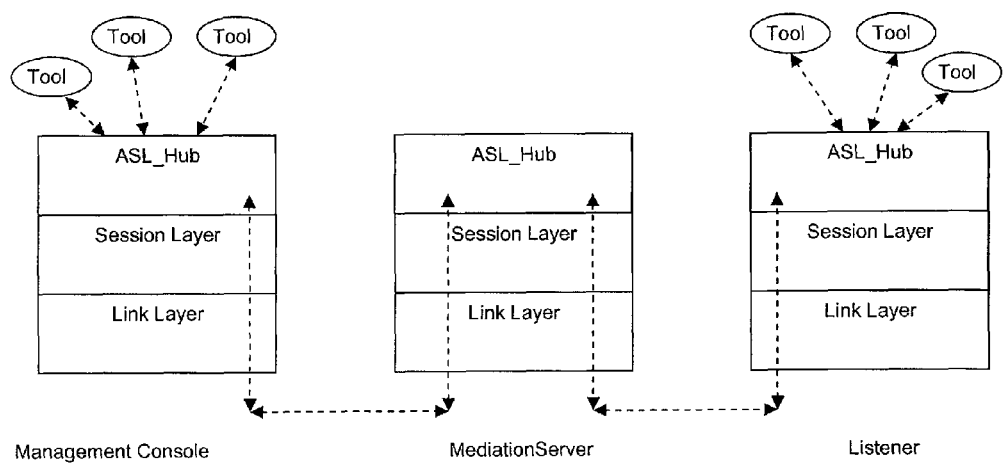
FIG. 7 is an overview of a protocol architecture.

FIG. 7 is a schematic illustration of overview protocol architecture which protocol stack has three layers: Application Sub Layer (ASL) Hub, Session Layer and Link Layer. The ASL Hub Layer is the topmost layer of the protocol stack which acts as a Hub in establishing connection with the Tools (Applications like Remote control, Mobile Desktop, Banner Notification) and the Session Layer. For every Application request an appropriate instance of the session is invoked. The Session Layer establishes session for every connection request that comes. The Link Layer establishes two types of links for the peers to communicate with each other and send information.

A Bearer Link will be used to send only bearer messages between two communicating peers (processes). A Signaling Link will be used to send only signaling messages between two communicating peers (processes). Signaling link may be used to carry Bearer Link data (BOS: Bearer Over Signaling) if necessary (For example: Banner Notification. URL can be sent to the device on signaling link). This will avoid any additional resource usage by sending the data on a bearer link.

Peer-to-Peer Communication takes place by the exchange of the right Signal codes on the signaling link. All Signal Codes except OK and ERROR. Signal codes OK and ERROR are the only two codes which will be used as a Response with appropriate status indicating success or failure. Commands and messages are passed between layers the following ways. A) Each layer will provide methods which are availed by the upper layer; 2) Lower layers will notify registered upper layers using events and 3) Upper layers can register with the lower layers to receive messages through callback.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method, as implemented in a server, of providing an automatic session recovery during a remote management session between a mobile device and the server, the method comprising:
   detecting a broken communication link in the remote management session between the mobile device and the server during the on-going remote management session;
   communicating detection of the broken communication link between the mobile device and the server in the on-going remote management session to a management console;
   receiving an acknowledgement from the management console, wherein the management console transitions to a suspend state for the on-going remote management session for the mobile device;
   reestablishing the communication link between the mobile device and the server for the suspended on-going remote management session with the mobile device;
   transitioning to an open state for the on-going remote management session; and
   notifying the management console and the mobile device, wherein the mobile device accepts remote management session information and automatically performs remote management session reconnection enabling normal operations of the on-going remote management session.

2. The automatic session recovery method according to claim 1, wherein the management console is notified by sending a signal over a signal link.

3. The automatic session recovery method according to claim 2, wherein the signal is an alert signal.

4. The automatic session recovery method according to claim 2, wherein upon receiving the signal the management console will stop communicating with the mobile device.

5. The automatic session recovery method according to claim 2, wherein the link is a bearer link used to send bearer messages between two communicating peers.

6. The automatic session recovery method according to claim 1, wherein any data sent to the mobile device via the server from the management console is dropped.

7. The automatic session recovery method according to claim 1, wherein the automatic session recovery is operated from the management console through the server.

8. The automatic session recovery method according to claim 1, wherein the link is a signal link used to send signaling messages between two communicating peers.

9. A system for providing automatic session recovery during a remote management session, comprising:
   a server configured to detect a broken communication link between a mobile device and the server during an established remote management session;
   the server configured to communicate detection of the broken communication link to a management console;
   the server configured to receive an acknowledgement from the management console, wherein the management console transitions to a suspend state for the established remote management session with the mobile device;
   the server configured to reestablish a communication link with the mobile device;
   the server configured to transition to an open state for the established remote management session that is currently suspended; and
   the server configured to notify the management console and the mobile device,
   wherein the mobile device accepts the established remote management session information and performs automatic session reconnection enabling normal operations of the remote management session.

10. The system according to claim 9, wherein the console is notified by sending a signal over a signal link.

11. The system according to claim 10, wherein the signal is an alert signal.

12. The system according to claim 10, wherein upon receiving the signal the management console will stop communicating with the mobile device.

13. The system according to claim 10, wherein the link is a bearer link used to send bearer messages between two communicating peers.

14. The system according to claim 9, wherein any data sent to the mobile device via the server from the management console is dropped.

15. The system according to claim 9, wherein the automatic session recovery is operated from the management console through the server.

16. The system according to claim 9, wherein the link is a signal link used to send signaling messages between two communicating peers.

* * * * *